United States Patent [19]

Shimano

[11] Patent Number: 4,807,045

[45] Date of Patent: Feb. 21, 1989

[54] IMAGE DATA PROCESSING METHOD AND APPARATUS THEREFOR

[75] Inventor: Noriyuki Shimano, Uji, Japan

[73] Assignee: Dainippon Screen Mfg. Co., Ltd., Kyoto, Japan

[21] Appl. No.: 75,835

[22] Filed: Jul. 17, 1987

[30] Foreign Application Priority Data

Jul. 18, 1986 [JP] Japan ................... 61-170504
Jul. 28, 1986 [JP] Japan ................... 61-178295

[51] Int. Cl.$^4$ .............................................. H04N 1/40
[52] U.S. Cl. ..................................... 358/282; 358/283
[58] Field of Search ............... 358/284, 282, 283, 280

[56] References Cited

U.S. PATENT DOCUMENTS

| 4,578,711 | 3/1986 | White | 358/282 |
| 4,601,058 | 7/1986 | Seto | 358/282 |
| 4,641,267 | 2/1987 | Asai | 358/280 |
| 4,691,240 | 9/1987 | Kurusu | 358/282 |
| 4,734,783 | 3/1988 | Horikawa | 358/282 |

Primary Examiner—Howard W. Britton
Attorney, Agent, or Firm—Lowe, Price, LeBlanc, Becker & Shur

[57] ABSTRACT

A white reference density plate and a black reference density plate are provided in the vicinity of an original. A linear image sensor reads respective optical density of the white reference density plate and of the black reference density plate, whereby reference level data are fetched in an image data processing apparatus. The reference level data are subtracted from image data of the original for eliminating background components from the image data, so that new image data are obtained.

11 Claims, 16 Drawing Sheets

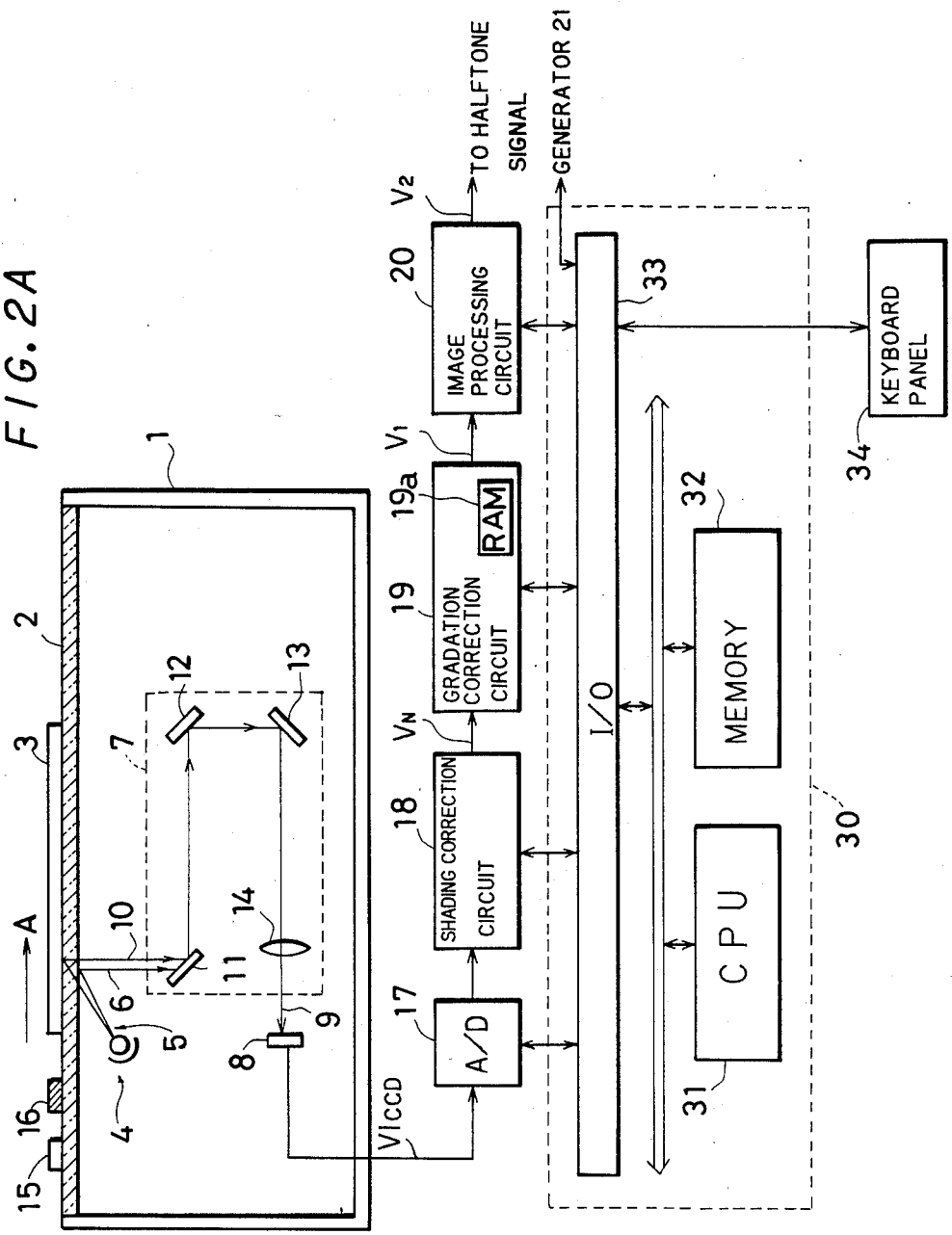

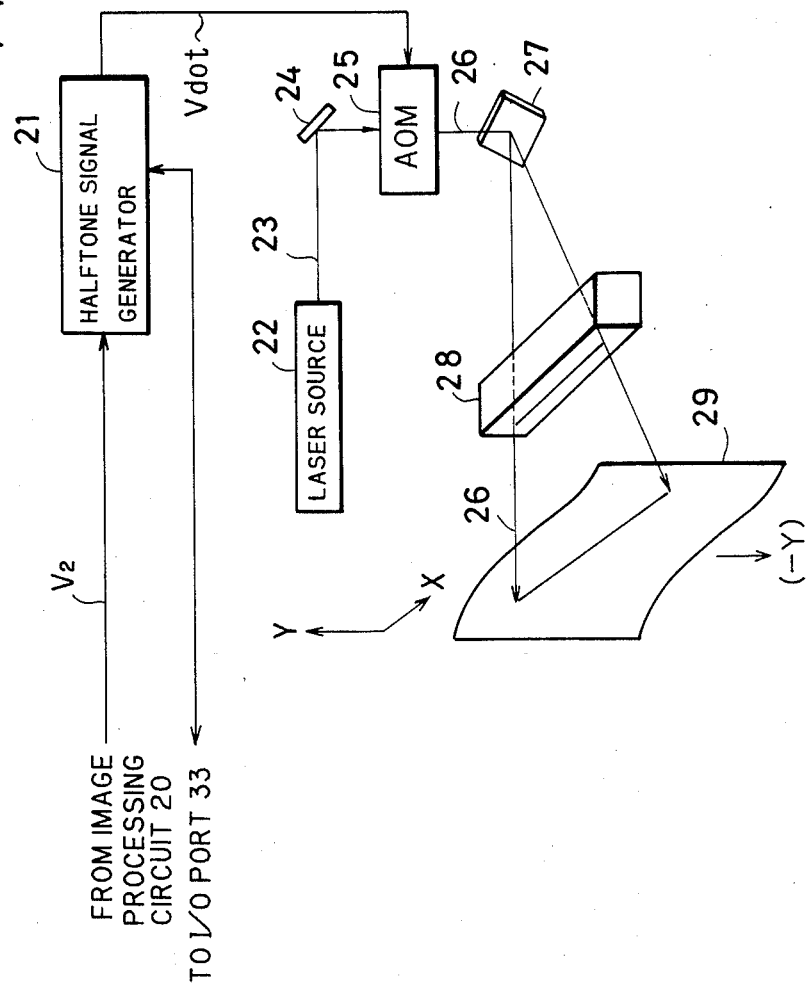

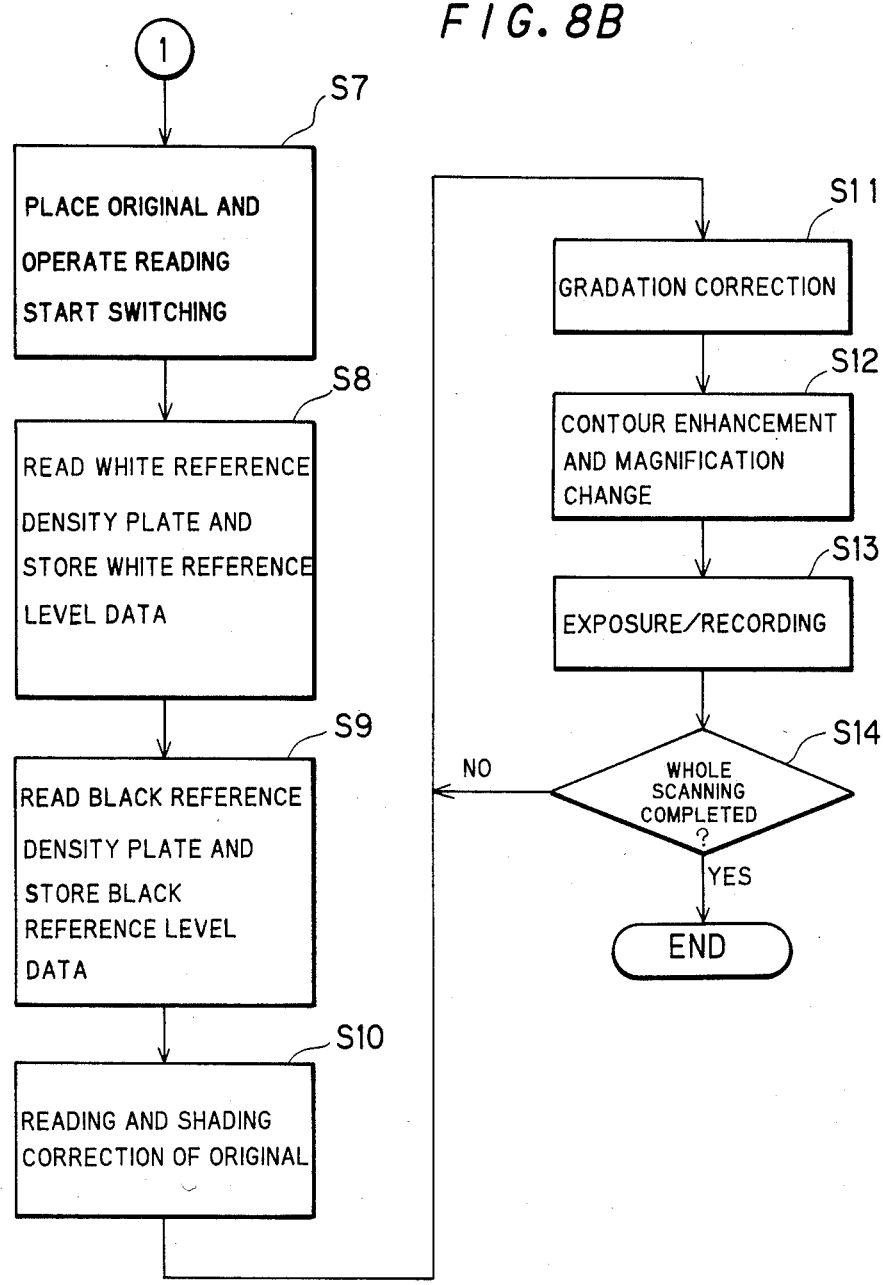

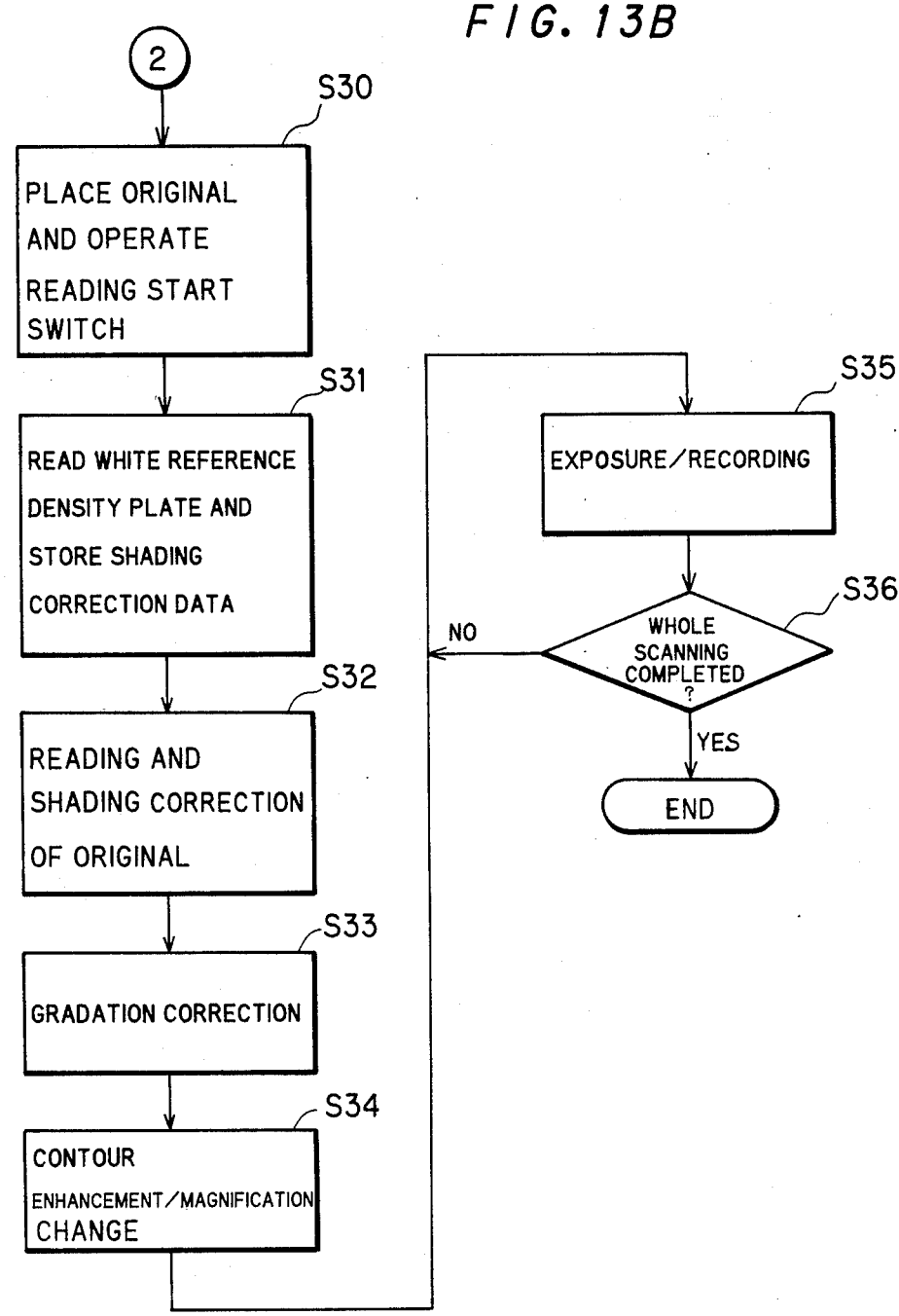

IMAGE DATA PROCESSING METHOD AND APPARATUS THEREFOR

BACKGROUND OF THE INVENTION

1. Field of the Invention

The present invention relates to an image data processing method and an apparatus therefor for obtaining image data correctly reflecting the gradation of an original.

2. Description of the Prior Art

In an image data processing apparatus such as a process scanner or a fascimile, it is important to correctly read the gradation of an original image. FIG. 1 partially shows an example of a conventional reflection type optical image reading mechanism employed for such an image data processing apparatus. Referring to FIG. 1, an original 3 is placed in a downwardly directed state on the upper surface of a transparent original receiving glass plate 2 provided in an upper opening of frame box 1. Light 5 from a light source 4 is irradiated on the original 3 through the original receiving glass plate 2. Reflected light 10 from the original 3 enters a photoelectric converter, such as a CCD line sensor 8, though an image-forming optical system 7 comprising mirrors, lenses and the like. Such a photoelectric converter may also be prepared by a photomultiplier or a photodiode. The CCD line sensor 8 generates an image signal $V_{CCD}$ which is responsive to the intensity of light 9 incident upon its light receiving surface. The image signal $V_{CCD}$ is subjected to desired image processing, to be employed for exposure/recording on a photosensitive material (not shown) or image data transfer.

In such an image reading mechanism, the incident light 9 is expected to reflect the gradation of the original 3 in fidelity if the light 9 received in the CCD line sensor 8 includes only the reflected light 10 from the original 3. In practice, however, the light 5 emitted from the light source 4 is reflected also by the lower surface of the original receiving glass plate 2. Therefore, light 6 reflected by the glass plate 2 is also included in the incident light 9 upon the CCD line sensor 8. Further, flare light (not shown) scattered through the inner wall surface of the frame box 1, other portions of the apparatus and the like is also received in the light receiving surface of the CCD line sensor 8.

Therefore, the image signal $V_{CCD}$ has background components irrelevant to image data of the original 3 by background light such as the reflected light 6 from the original receiving glass plate 2 and the flare light (stray light). As a result, it is difficult to correctly detect the gradation of the original 3 in the apparatus employing such a mechanism.

Description is now made on the influence exerted by such background light in the case of a process scanner. In the process scanner, an operator selects highlight and shadow points from bright and dark parts of the original 3 respectively, as is well known in the art. Optical density levels of these points are measured and halftone area rates for tint generation are designated with respect to the highlight and shadow points. A gradation correction curve (gradation curve) defining a relation between the optical density and the halftone area rate is determined on the basis of these data. The inputted image signal is subjected to shading correction, to be further subjected to gradation correction along the gradation correction curve. As a result, an exposure/recording signal responsive to the halftone area rate is obtained.

When the background light is present, however, it is impossible to obtain the gradation expression intended by the operator in image recording. In the case of positive recording, for example, the recorded image is entirely shifted to a brighter side (lower optical density side) from the original image.

Particularly in a dark side portion of the gradation curve, the amount of the background light is substantially equal to or larger than the amount of the light from a dark portion of the original, whereby the effect of by the background light on gradation expressibility is relatively increased. Thus, gradation expressibility in the dark portion is deteriorated in a positive recorded image. A similar problem takes place in a bright portion in the case of a negative recorded image.

In order to overcome the problem, there has been proposed an attempt to prevent generation of such background light itself. In practice, however, such an attempt has little implemetability in technique and cost, and hence the same cannot suitably cope with the problem.

SUMMARY OF THE INVENTION

The present invention is directed to an image data processing method and apparatus therefor for processing first image data obtained by optically reading the image of an original having gradation thereby to obtain second image data correctly reflecting the gradation of the original. The image data processing method comprises the steps of: (a) preparing a reference density plane having a known optical density; (b) reading the optical density of the reference density plane with a photoelectric converter while detecting an output level of the photoelectric converter to obtain reference level data expressing the output level; (c) obtaining first image data by reading the image of the original by the photoelectric converter, and (d) removing a background component from the first image data on the basis of the reference level data thereby to obtain second image data, the background component being outputted from the photoelectric converter independently of the image of the original.

According to an aspect of the present invention, the forth step includes an arithmetic step of making background components included in both of the first image data and the reference level data cancel each other. This arithmetic step may be performed in shading correction of the first image data.

According to another aspect of the present invention, the value of a background parameter depending on the value of the background components is obtained on the basis of the reference level data. A gradation correction curve for performing gradation correction of the first image data is modified by an amount responsive to the value of the background parameter. The gradation correction for the first image data is performed along the modified gradation correction curve, whereby the background component is automatically removed from the first image data.

Accordingly, an object of the present invention is to provide image data correctly reflecting the gradation of an original.

Another object of the present invention is to remove reading errors in image density caused by incidence of background light, which is irrelevant to the image of an original.

Still another object of the present invention is to obtain image data of high gradation expressibility for an original.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2A and 2B are general views showing a first embodiment of the present invention;

FIGS. 8A and 8B are flow charts showing the operation of the first embodiment;

FIGS. 13A and 13B are flow charts showing the operation of the second embodiment.

DESCRIPTION OF THE PREFERRED EMBODIMENTS

Figure 1:
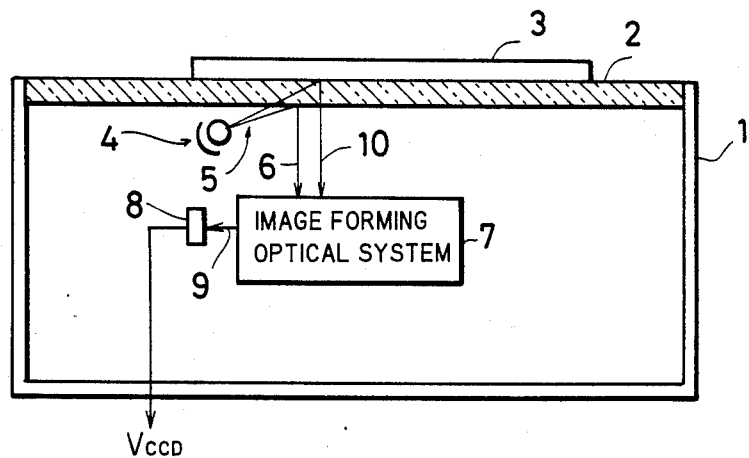
FIG. 1 is an expanatory diagram of a conventional reflection type image reading mechanism.

FIGS. 2A and 2B are schematic block diagrams showing a process scanner in which an image data processing apparatus according to a first embodiment of the present invention is assembled. The process scanner shown in FIG. 1 comprises a transparent original receiving glass plate 2 provided in an upper opening of a frame box 1, so that an original 3 is placed on the glass plate 2 in a downwardly directed state. The original receiving glass plate 2 is provided in its upper end surface with a white reference plate 15 and a black reference plate 16 having reference optical density of known optical density levels respectively. The white and black reference plates 15 and 16 are employed for shading correction with background correction. The white reference plate 15 is provided also in a conventional process scanner for shading correction, while the black reference plate 16 is newly provided in this embodiment.

Illumination light 5 from a light source 4, which is formed by a halogen lamp or the like, is reflected by the surface of the original 3 to enter a first mirror 11 included in an optical system 7. The light reflected by the first mirror 11 is successively reflected by second and third mirrors 12 and 13, to form an image on a light receiving surface of a CCD line image sensor 8 serving as a photoelectric converter through an image forming lens 14. The CCD line image sensor 8 comprises a plurality of CCD elements one-dimensionally arrayed in a direction perpendicular to the drawing. Thus, the direction perpendicular to the drawing corresponds to a main scanning direction.

Background light irrelevant to the image of the original 3 also enters the interior of the optical system 7. This background light includes reflected light 6 generated by reflection of the illumination light 5 from the light source 4 by the surface of the original receiving glass plate 2 and flare light (not shown) generated by scattering of light at the inner wall of the frame box 1 and other portions of the apparatus. Thus, incident light 9 in the CCD line sensor 8 includes such unwanted light components.

The incident light 9 is photoelelctrically converted into an image signal $V_{iCCD}$ by the CCD line image sensor 8. The image signal $V_{iCCD}$ is digitized by an A-D converter 17, to be supplied to a shading correction circuit 18. The shading correction circuit 18 is originally adapted to correct nonumiformity in illumination on the surface of the origianl 3, nonuniformity in image forming function of the image forming optical system 7 and nonuniformity in sensitivity of the respective CCD elements forming the CCD line sensor 8. However, as described later, effect of the background light is also automatically removed by shading correction processing in the shading correction circuit 18.

The shading correction circuit 18 receives the digitized first image data $V_{iCCD}$, to generated a second image data (image signal) $V_N$. The image signal $V_N$ is supplied to a gradation correction circuit 19 including a look-up table RAM 19a to be subjected to gradation correction.

An image signal $V_1$ obtained from the gradation correction circuit 19 is supplied to an image processing circuit 20 of a subsequent stage, to be subjected to processing such as contour enhancement and magnification change in the image processing circuit 20. An image signal $V_2$ outputted from the image processing circuit 20 is supplied to a halftone dot signal generator 21. A halftone dot signal $V_{dot}$ generated in the halftone dot generator 21 serves as a modulation control signal for an acoustic optical modulator 25.

The acoustic optical modulator 25 receives laser beam 23 from a laser source 22 thorugh a mirror 24. The acustic optical modulator 25 modulates the laser beam 23 on the basis of the halftone dot signal $V_{dot}$, to provide an exposure beam 26. The exposure beam 26 is horizontally oscillated by vibration of a galvano mirror 27, to be irradiated on a recording photosensitive material 29 through an image forming optical system 28 formed by an $f\theta$ lens and the like. The vibration of the galvano mirror 27 is synchronous with output timing of the CCD elements in the CCD line sensor 8, thereby to achieve optical scanning in the main scanning direction X.

The light source 4 and first mirror 11 are fixed to a mechanism (not shown) for relatively translating the original 3 in a direction A, whereby the original 3 is moved in the direction A for scanning. In synchronization with this, the photosensitive material 29 is withdrawn in the downward direction ($-Y$), thereby to achieve reading subscanning in the direction A and recording subscanning in a direction Y.

On the other hand, this apparatus is provided with a microcomputer 30 for controlling the respective circuits and processing the respective data. The microcomputer 30 has a CPU 31 and a memory 32, and is connected with the shading correction circuit 18, the gradation correction circuit 19, the image processing circuit 20 and the halftone dot signal generator 21 through an I/O port 33. A keyboard panel 34 for inputting various data as hereinafter described is also connected to the I/O port 33.

Figure 3:
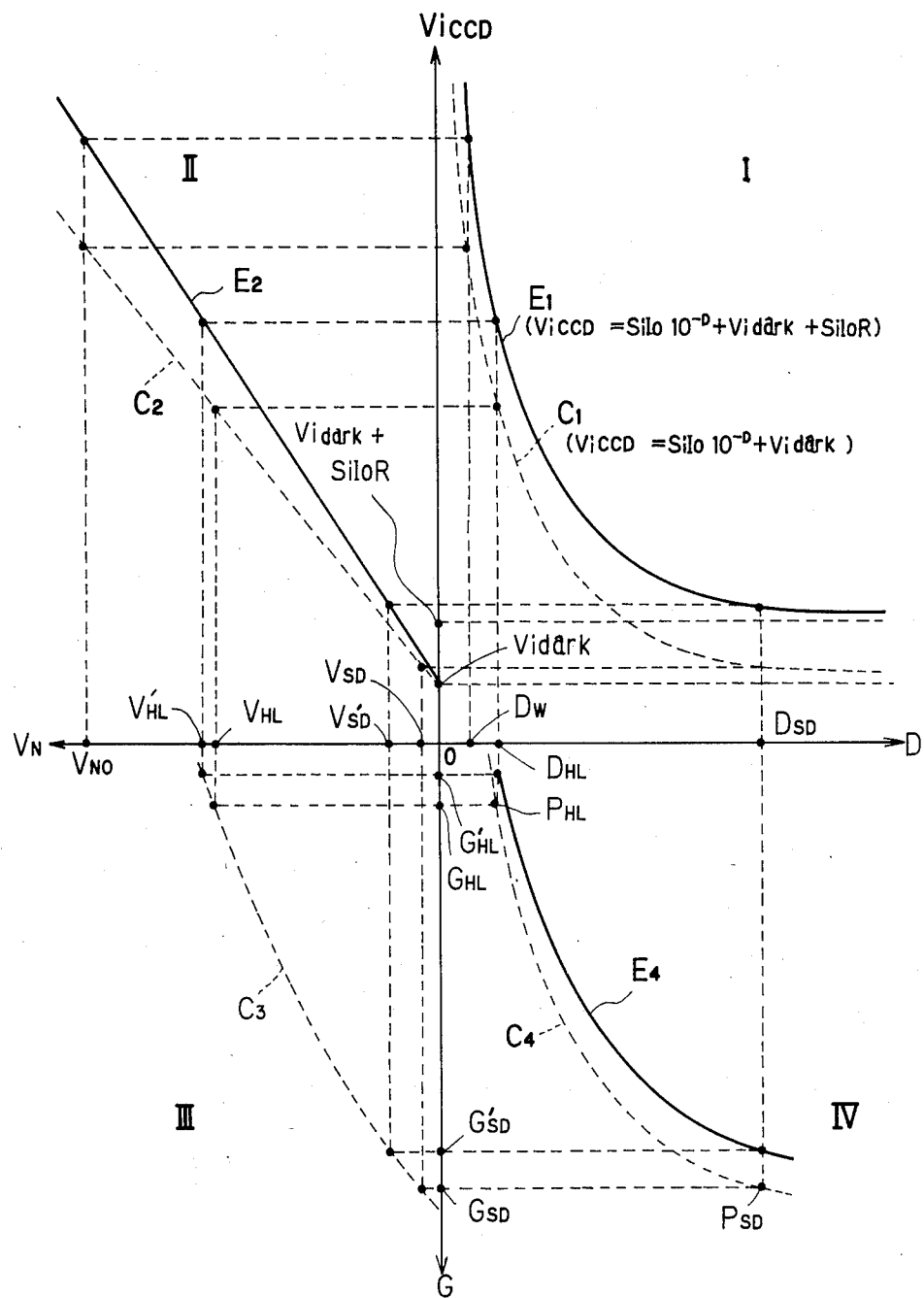
FIG. 3 is a graph showing image data conversion characteristics in conventional image processing.

Description is made of the operation characteristics with respect to a virtual case where there is no background light. FIG. 3 illustrates various characteristic curves on a two-dimensional plane formed by four-directional coordinate axes. Within the four coordinate axes, the first axis rightwardly extending from the origin O represents scales of an optical density D of the original. The upwardly extending second axis represents scales of the digitized value of the image signal $V_{iCCD}$ outputted from the CCD line sensor 8. Since quantization errors by such digitization are not important in this embodiment, digital signal values are not distinguished from analog signal values, but are also indicated by the same symbol $V_{iCCD}$. The subscript "i" of the symbol $V_{iCCD}$ indicates the output level of an i-th element of the CCD line sensor 8.

Curves shown in first quadrant I formed by the first and second coordinate axes show photoelectric transfer characteristics in the CCD line sensor 8. In the virtual case with absence of the background light, this characteristic is expressed as follows:

$$V_{iCCD} = S_i I_0 10^{-D} + V_{idark} \quad (1)$$

where respective symbols are defined as follows:
$S_i$: the photosensitivity of the i-th CCD element
$I_0$: amount of light irradiated on the original 3
$V_{idark}$: output voltage of the i-th CCD element when no lights are received ("dark output voltage")

Namely, the image signal $V_{iCCD}$ is expressed by the sum of the output voltage reflecting the density of the original 3 and the dark output voltage $V_{idark}$. The characteristic curve of the expression (1) is drawn by a broken line $C_1$ in first quadrant I, and this is an exponential curve having an asymptotic line of $V_{iCCD} = V_{idark}$.

The third axis leftwardly extending from the origin 0 represents the level of the output signal $V_N$ supplied from the shading correction circuit 18. Therefore, second quadrant II is a region for showing the correction characteristic of the shading correction. This shading correction is expressed by the following expression for each CCD element:

$$V_N = V_{NO} \frac{V_{iCCD}(D) - V_{iOFF}}{V_{iCDD}(D_W) - V_{iOFF}} \quad (2)$$

where:
$V_{iCCD}(D)$: output voltage of i-th CCD element in reading of an original pixel of optical density D
$V_{iCCD}(D_W)$: output voltage of i-th CCD element in reading white reference plate 15 having an optical density $D_W$ ("white reference level")
$V_{iOFF}$: output voltage of i-th CCD element when the light source 4 is turned off ($= V_{idark}$)
$V_{NO}$: data value previously designated in connection with the value of the optical density $D_W$ of white reference plate 15

It is easily understood that the expression (2) corresponds to a straight line with respect to $V_{iCCD}(D)$, which is shown by a broken line $C_2$ in second quadrant II. From the expressions (1) and (2), the relation between the original density D and the image signal $V_N$ after shading correction can be expressed as follows:

$$V_N = V_{NO} 10^{-D}/10^{-D_W} \quad (3)$$

On the other hand, the fourth axis downwardly extending in FIG. 3 represents the halftone area rate G of an outputted halftone dot image. Therefore, a gradation correction curve for determining the relation for mapping the image signal $V_N$ after shading correction with the halftone area rate G is drawn in third quadrant II. This gradation correction curve $C_3$ is set in response to a curve $C_4$ in the fourth quadrant IV, i.e., the curve for determining which halftone area rate G is to correspond to the original density D.

For example, the operator previously extracts highlight and shadow points from the original 3 to measure optical density levels $D_{HL}$ and $D_{SD}$ of these points by a densitometer independent of the apparatus as shown in FIGS. 2A and 2B. Then the operator arbitrarily determines halftone area rates $G_{HL}$ and $G_{SD}$ with respect to the highlight and shadow points. Two points $P_{HL}$ and $P_{SD}$ in the fourth quadrant IV of FIG. 3 are defined by these data $D_{HL}$, $D_{SD}$, $G_{HL}$, and $G_{SD}$. Further, several points (not shown) in the interval between these two points $P_{HL}$ and $P_{SD}$ are set to determine the curve $C_4$ passing through all of these points.

Figure 4:
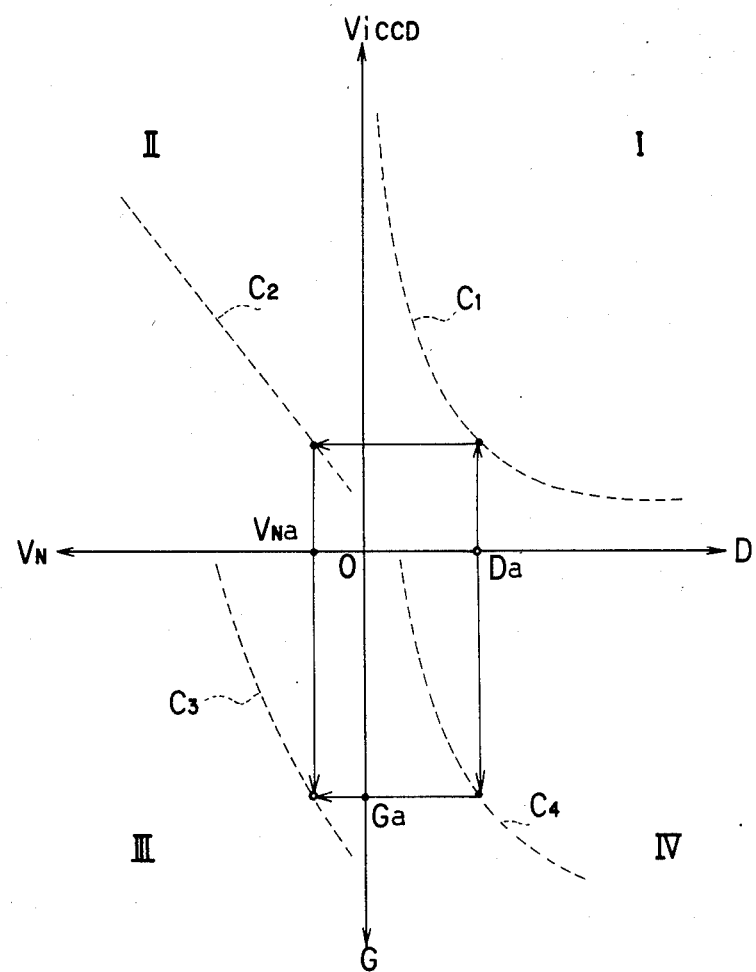
FIGS. 4 and 4 are graphs illustrating relations between various characteristic curves.

When the curve $C_4$ in the fourth quadrant IV is set, a corresponding relation between an image signal value $V_{Na}$ obtained from an arbitrary density level $D_a$ through the curves $C_1$ and $C_2$ and a halftone area rate $G_a$ obtained through the curve $C_4$ with respect to the density level $D_a$ is determined as illustrated in FIG. 4. The gradation correction curve $C_3$ drawn in the third quadrant III expresses the corresponding relations with respect to each density level D.

Figure 5:
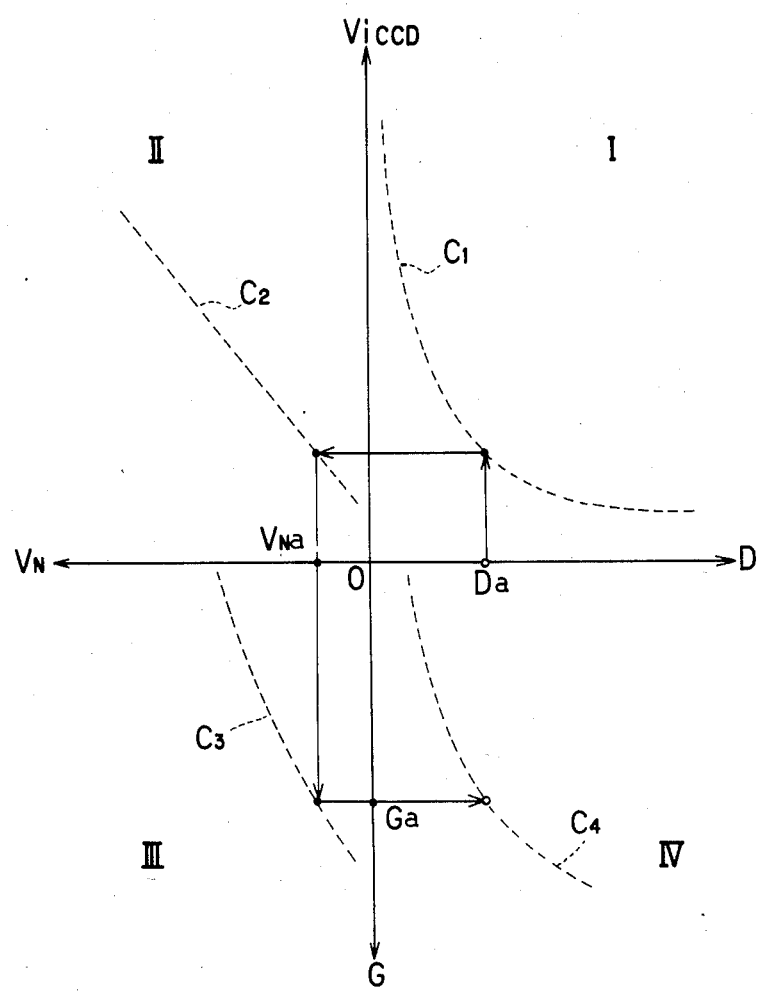

Shading correction and gradation correction are performed in the aforementioned manner in the case of absence of background light. In such a virtual case, therefore, when the original density $D_a$, for example, is read by the CCD line sensor 8 and the shading and gradation corrections on the read image data, are successively performed, a desired halftone area rate $G_a$ is obtained through a conversion path as shown in FIG. 5.

Then, consider such a case wherein the conventional method is applied when background light such as that reflected by the original receiving glass plate 2 or flare light is present. In this case, the relation between the optical density D and the output signal $V_{iCCD}$ is as follows:

$$V_{iCCD} = S_i I_0 10^{-D} + V_{idark} + S_i I_0 R \quad (4)$$

where $$R = R_{ref} + R_{fla} = \text{background parameter} \quad (5)$$

$R_{ref}$: optical reflection factor on the surface of the original receiving glass plate 2
$R_{fla}$: flare light composition ratio The expression (4) corresponds to the expression (1), except for addition of the background light component ($S_i I_0 R$). This background light component ($S_i I_0 R$) is substantially at a constant value, whereby a characteristic curve $E_1$ in FIG. 3 corresponding to the expression (4) is obtained by uniformly upwardly shifting the characteristic curve $C_1$ corresponding to the expression (1).

On the other hand, the transformation rule for defining shading correction of this case is identical in functional form to the expression (2). However, although the functional form is identical to that of the expression (2), the value of $V_{iCCD}(D_W)$ in the expression (2) is increased by presence of the background light, whereby a proportional coefficient with respect to $V_{iCCD}$ is decreased by:

$$V_{NO}/(V_{iCCD}(D_W)-V_{iOFF})$$

as compared with the case of absence of the background light. Thus, the inclination of the straight line with respect to the $V_{iCCD}$ axis is decreased in the second quadrant II in FIG. 3. In other words, the inclination with respect to the $V_N$ axis is increased, whereby the straight line $E_2$ is obtained. Such a change is automatically incorporated by reading the optical density of the white reference plate 15 of FIG. 2A.

The relational expression for the density D and the signal $V_N$, which is obtained by substituting the expression (4) in the expression (2), is as follows:

$$V_N = V_{NO}(10^{-D}+R)/(10^{-D_W}+R) \qquad (6)$$

Further, the gradation correction curve $C_3$ previously obtained with respect to the case of absence of the background light is employed as the gradation correction curve in the third quadrant III, ragardless of presence/absence of the background light.

Consider such a case wherein the density level $D_{SD}$ of the shadow point is read in such circumstances. Then, a halftone area rate $G'_{SD}$ is obtained through the characteristic curves $E_1$, $E_2$ and $C_3$ of FIG. 3, and the halftone area rate $G'_{SD}$ is different from the halftone area rate $G_{SD}$ previously designated with respect to the shadow point. This also applies to other density levels. For example, a halftone area rate $G'_{HL}$ is obtained with respect to the density level $D_{HL}$ of the highlight point. Thus, the relation between the density D and the halftone area rate G is expressed by a curve $E_4$ as shown in the fourth quadrant IV.

Figure 6:
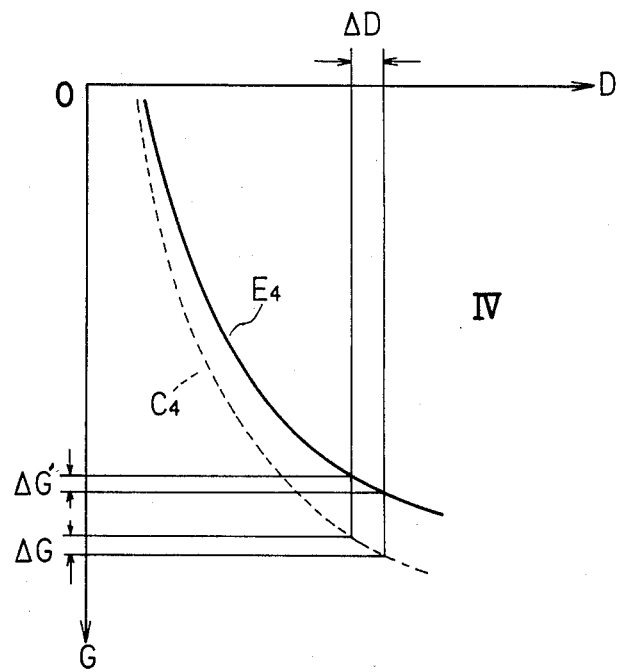
FIG. 6 is a diagram showing a relation between density difference and halftone area rate difference.

Namely, the halftone area rate G intended by the operator cannot be obtained with respect to each density level D in the conventional method; instead, the characteristic curve $E_4$ entirely shifted toward the highlight side is obtained. Further, the inclination of the characteristic curve $E_2$ in the vicinity of the shadow point is smaller than that of the previously intended characteristic curve $C_4$, as is obvious from FIG. 3. As the result, the difference in halftone area rate with respect to the same density difference D at a level G' becomes smaller than that of a previously intended value G as shown in FIG. 6. Thus, the shadow part is deteriorated in gradation expressibility.

According to the first embodiment of the present invention, therefore, the shading correction performed in the shading correction circuit 18 is not the shading correction by the expression (2), but rather is the correction provided by the following expression (7):

$$V_N = V_{NO}\frac{V_{iCCD}(D) - V_{iCCD}(D_B)}{V_{iCCD}(D_W) - V_{iCCD}(D_B)} \qquad (7)$$

where $D_B$ represents the density level of the black reference plate 16. Symbol $V_{iCCD}(D_B)$ represents "black reference level" corresponding to the output level of the i-th CCD element of the CCD line sensor 8 in a state wherein the light source 4 is turned on, i.e., in the case wherein the light 5 from the light souce 4 is irradiated on the surface of the black reference plate 16 (reference density plane).

The expression (7) is introduced along the lines of the following: First, it is noted that the conventional method is based on the premise that, even if light is irradiated on a black substance of infinite absorptance placed on the original receiving glass plate 2, no light is incident upon the CCD line sensor 8 since the black substance entirely absorbs the light. Therefore, shanding correction is performed by employing the value of turn-off output voltage $V_{iOFF}$ (=dark output voltage $V_{idark}$) in the conventional case. As a result, the image data $V_N$ after the shading correction inevitably has the relation shown by the expression (6) with respect to the original density D, whereby the effect of the background light is inevitably applied to the image data $V_N$ through the background parameter R.

Such an effect by the background light can be eliminated by the aforementioned expression (7). In order to prove this, it is noted that the following expression (8) holds on the basis of the expression (4):

$$V_{iCCD}(D_B)=S_iI_010^{-D}+V_{idark}+S_iI_0R \qquad (8)$$

Then, the expression (7) is transformed, through the expressions (4) and (8), into the following expression (9):

$$V_N = V_{NO}\frac{10^{-D} - 10^{-D_B}}{10^{-D_W} - 10^{-D_B}} \qquad (9)$$

It is obvious that the expression (9) includes no backgound parameter R. Namely, the effect of the background light can be removed by performing shading correction along the lines of the expression (7).

Thus, the effect of the background light can be removed by obtaining the difference between the image data $V_{iCCD}(D)$ obtained by reading the original and a reference level data (black reference level data $V_{iCCD}(D_B)$ in the aforementioned example) in the turn-off state of the light source. This is because the effect of the background light on the output $V_{iCCD}(D)$ of the CCD line sensor 8 is included in the expression (2) as an addtional term. Namely, subtraction is so performed that background components included in the photoelectric converter outputs corresponding to difference densities cancel each other through since identical or substantially identical background components appear in the output of the CCD line sensor 8, regardless of the density of the reading image. Therefore, the effect of the background components can be removed by arithmetic processing performed to excute such subtraction, not only in the aforementioned case of performing the subtraction for shading correction but in other cases as well. Such a generalization is hereinafter described.

When the density level $D_B$ of the black reference plate 16 is sufficiently larger than the density level $D_W$ of the white reference plate 15, i.e., when $D_B >> D_W$, an expression:

$$10^{-D_B} << 10^{-D_W}$$

is held, whereby the denominator of the expression (9) can be approximated by $10^{-D_W}$. Therefore, when the density levels $D_W$ and $D_B$ are selected to satisfy such a condition, the expression (9) can be approximated by the following expression (10):

$$V_N \approx V_{NO} 10^{D_W}(10^{-D} - 10^{-D_B}) \quad (10)$$

Description is now made in further detail on shading correction along the lines of the expression (10), with reference to such a case wherein the condition of $D_B << D_W$ is satisfied.

Figure 7:
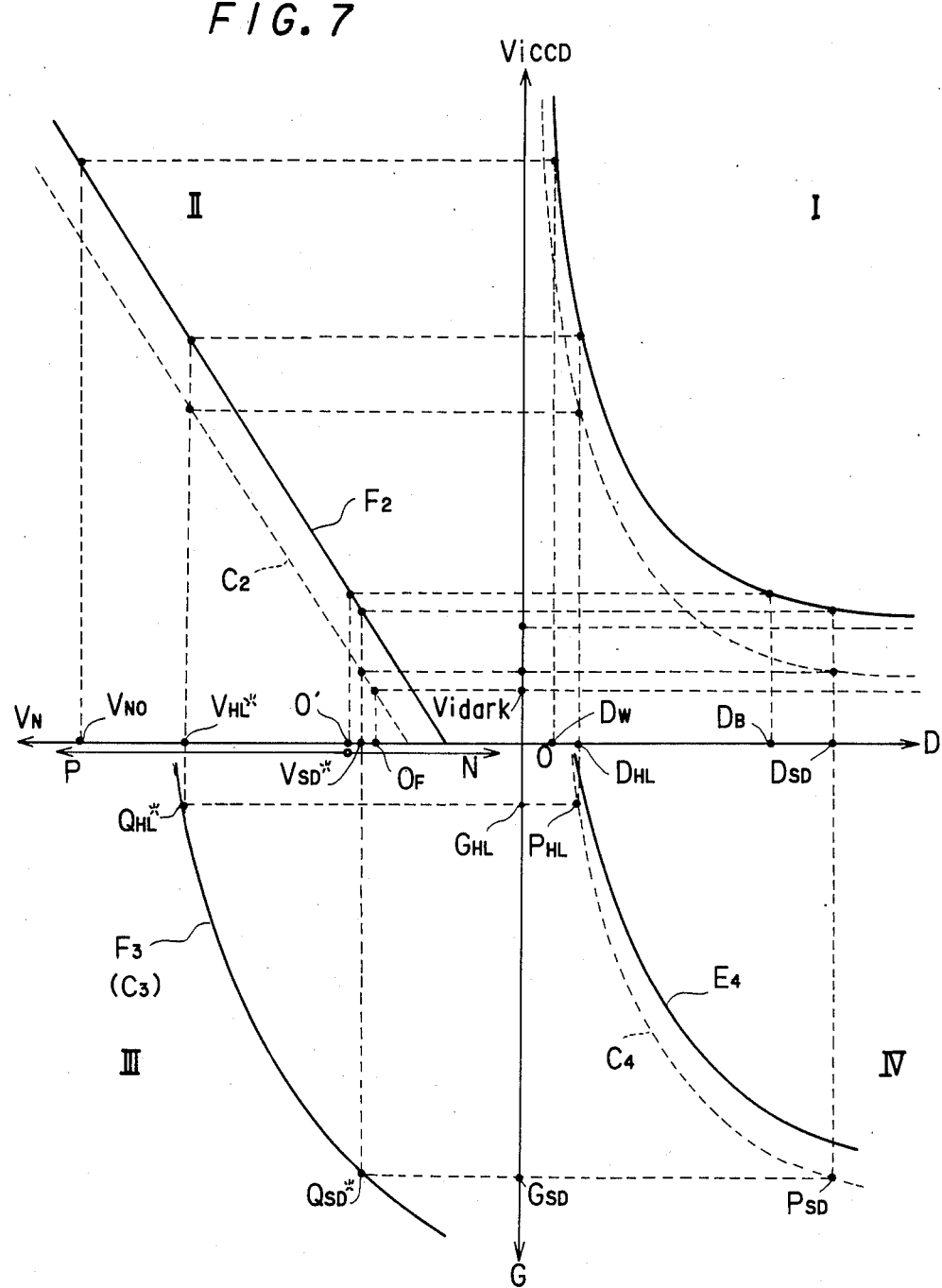
FIG. 7 is a graph showing image data conversion characteristics in the first embodiment.

FIG. 7 illustrates respective characteristic curves formed along the lines of the improved method in a similar manner to FIG. 3. However, the third axis leftwardly extending in FIG. 7 has its origin at O'. Therefore, the second quadrant II and the third quadrant III are entirely leftwardly shifted in comparison with FIG. 3. However, a straight line $C_2$ and a curve $C_3$ shown in FIG. 7 for the purpose of comparison are drawn in positional relation as if the origin is at a point $O_F$ (hereinafter described) on the third axis, which is different from the aforementioned origin O', as is obvious from a comparison with FIG. 3. Such a discrepancy is caused by the fact that the density level $D_B$ of the black reference plate 16 is not infinite in practice, as hereinafter described.

A straight line $F_2$ represented by the expression (7) is employed as a shading correction line. Values $V^*_{HL}$ and $V^*_{SD}$ of image data $V_N$ respectively corresponding to the density levels $V_{HL}$ and $D_{SD}$ highlight and shadow points are given by the following expressions (11) and (12) on the basis of the expression (10):

$$V^*_{HL} \approx V_{NO} 10^{D_W}(10^{-D_{HL}} - 10^{-D_B}) \quad (11)$$

$$V^*_{SD} \approx V_{NO} 10^{D_W}(10^{-D_{SD}} - 10^{-D_B}) \quad (12)$$

As is obvious from FIG. 7, the new shading correction line $F_2$ is shifted rightwardly (to the smaller side of $V_N$) in the figure in comparison with a shading correction line $C_2$ obtained under the assumption that no background light is present. The amount of the shift corresponds to the difference between the expressions (2) and (7). Namely, in consideration of the fact that the output $V_{iCCD}$ of the CCD linear sensor 8 is increased by an amount corresponding to the background light components when an arbitrary density level D is read by the CCD linear sensor 8, processing to lower level of $V_N$ by the amount is performed. The straight line $E_2$ of FIG. 3 is also rightwardly shifted with respect to the straight line $C_2$, but it is caused as a result of taking into account only that the black reference level data $V_{iCCD}(D_W)$ in the expression (2) is changed by the presence of the background light. In the conventional straight line $E_2$, therefore, the effect of the presence of the background light is not substantially eliminated.

On the other hand, the effects by the background light on both the white reference level data $V_{iCCD}(D_W)$ and the black reference density level $V_{iCCD}(D_B)$ are completely incorporated in the straight line $F_2$ in FIG. 7. Thus, the effects by the background light are completely eliminated. Particularly, such an effect is cancelled in both the numerator and the denominator of the expression (7) by obtaining a difference between two types of data, whereby it is not necessary to obtain the values of the background components themselves, as an important characteristic of the first embodiment.

However, it is practically impossible to prepare the black reference plate 16 in ideal black ($D_B$=infinite); the origin O' of the third axis in FIG. 7 is shifted to the left of the point $O_F$ corresponding to the case of $D_B$=infinite. Therefore, when a density level D, which is greater than the density level $D_B$ of the practically employed black reference plate 16 is read, a negative value ($V_N < O'$) is obtained on the third axis. Along the third axis of FIG. 7, there is a region where the image data $V_N$ have negative values in the range of an arrow N. The range of the arrow P represents the region where the image data $V_N$ have positive values. In this embodiment, a positive/negative sign is provided in the output data $V_N$ of the shading correction circuit 18 so that density levels corresponding to the image data $V_N$ of negative values can be also read and processed. In other words, the shading correction circuit 18 performs shading correction to convert the first image data $V_{iCCD}$ to the signal data $V_N$ having positive/negative sign.

Further, since the origin is not at $O_F$, but at O', the gradation correction curve $F_3$ in the third quadrant III is present at a position obtained by relatively shifting the gradation correction curve $C_3$ of FIG. 3 by a prescribed amount to a smaller side of the image data $V_N$, i.e., rightwardly in the figure. In other words, the curve $F_3$ corresponds to that obtained by drawing the curve $C_3$ of FIG. 3 in such a relation as if the origin is at the point $O_F$ of FIG. 7. Therefore, although the curves $F_3$ and $C_3$ overlap in FIG. 7, the actual origin in FIG. 7 is not at $O_F$, but at O', whereby the curve $C_3$ of FIG. 3 is not strictly identical to the curve $C_3$ in FIG. 7. However, since such a difference is caused by shifting of the origin, same symbol $C_3$ is indicated at both the curves in these figures.

The amount of such shifting is equal to the distance between the two origins O' and $O_F$. This distance is a difference between $V_N$ obtained directly from the expression (10) and $V_N$ obtained when $D_B = \infty$ in the expression (10), namely, ($V_{NO} 10^{D_W - D_B}$). Since $V_{NO}$, $D_W$ and $D_B$ are known values, this amount of shifting can be immediately obtained. As a result, the new gradation correction curve $F_2$ can also be easily obtained.

Further, corresponding to the fact that the output $V_N$ of the shading correction circuit 18 has a value with positive/negative sign, the gradation correction circuit 19 for performing gradation correction is adapted to receive data having positive/negative signs.

The new shading correction line $F_2$ thus obtained is employed in the first embodiment. Therefore, as is obvious from FIG. 7, conversion along a desired curve $C_4$ showing a relation between the optical density D and the halftone area rate G can be performed through the shading correction line $F_2$ and the gradation correction curve $F_3$ also in a case wherein the background light is present.

Figure 8A:
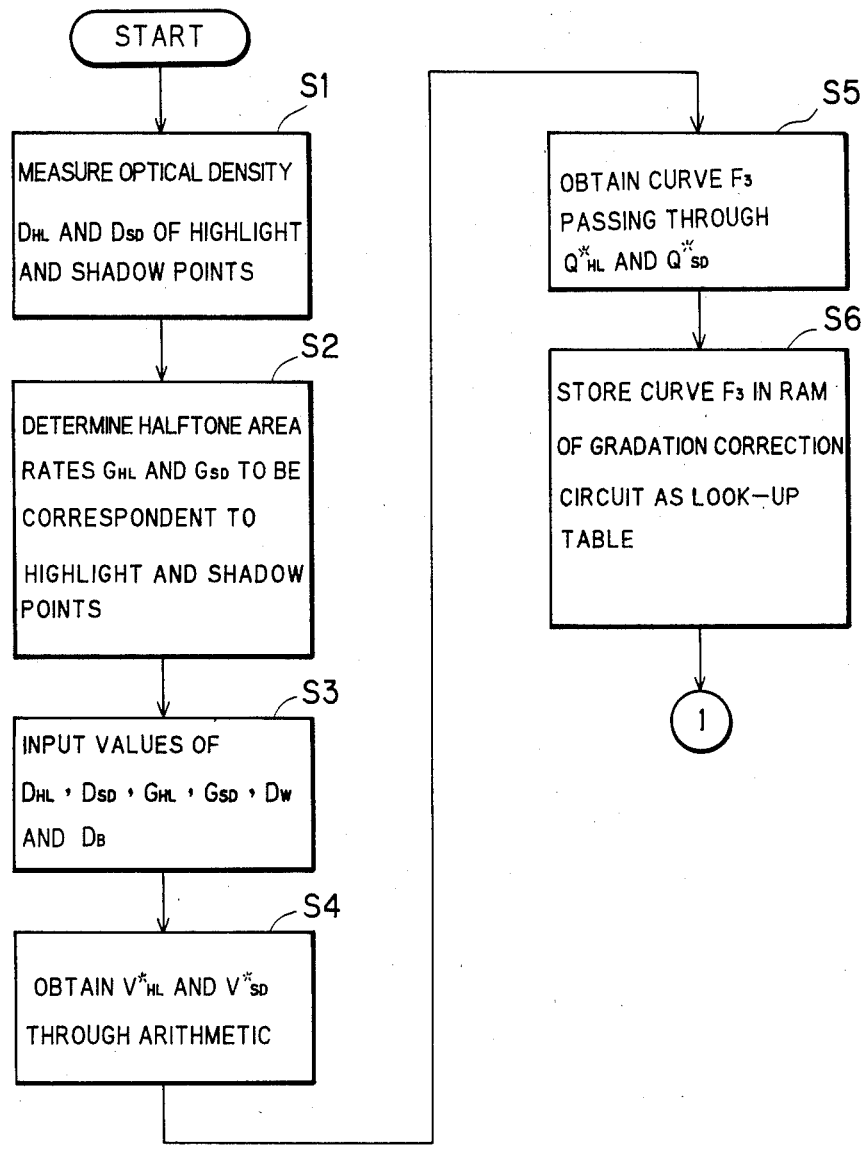

Description is now made of the operation of the first embodiment based on the aforementioned principle with reference to the flow chart shown in FIGS. 8A and 8B. At step S1 of FIG. 8A, the operator extracts highlight and shadow points from the original 3, and measures the density levels $D_{HL}$ and $D_{SD}$ thereof, as hereinabove described. Then the operator arbitrarily determines the halftone area rates $G_{HL}$ and $G_{SD}$ to correspond to the highlight and shadow points respectively (step S2). The operator then inputs the respective density levels $D_W$ and $D_B$ of the white and black reference plates 15 and 16 and the value $V_{NO}$ of the signal $V_N$ to which the white density level $D_W$ is to be converted, through a keyboard panel 34. The values $D_{HL}$, $D_{SD}$, $G_{HL}$ and $G_{SD}$ are also inputted. These values are stored in the memory 32 (step S3).

Upon completion of such operation, the CPU 31 calculates $V^*_{HL}$ and $V^*_{SD}$ arithmetically through the expressions (11) and (12) (step 4). The CPU 31 further specifies the coodinate values of the points $Q^*_{HL}$ and $Q^*_{SD}$ in the third quadrant III of FIG. 7, to numerically obtain the gradation correction curve $F_3$ passing through the points $Q^*_{HL}$ and $Q^*_{SD}$ (step S5). Then the CPU writes the gradation correction curve $F_3$ thus obtained in the RAM 19a of the gradation correction circuit 19 of FIG. 2A as a look-up table with the addresses of the image signal $Y_N$ after shading correction and the data of the halftone area rate G (step S6).

At a subsequent step S7, the original 3 is placed in a downwardly directed manner on the original receiving glass plate 2, and a reading start switch (not shown) is turned on. Then, movement in the subscanning direction and reading operation in the main scanning direction of this apparatus are started. In this operation, the optical density level of the white reference plate 15 is read in a turned-on state of the light source 4, so that the output signal $V_{iCCD}$ for each CCD element is digitized to be transferred to the shading correction circuit 18.

Figure 9:
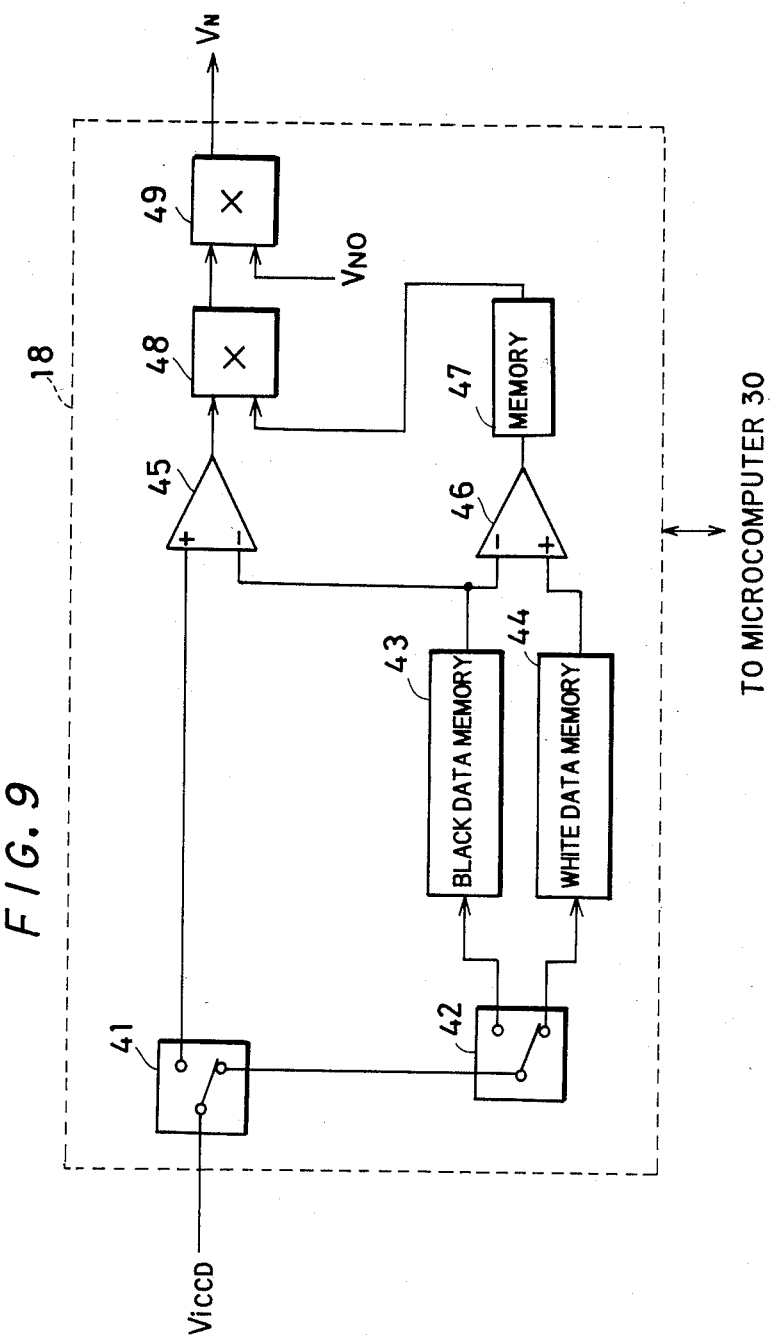
FIG. 9 is a block diagram showing internal structure of a shading correction circuit in the first embodiment.

FIG. 9 schematically shows the structure of the shading correction circuit 18. The white reference level data $V_{iCCD}(D_W)$ obtained by detecting the CCD output in reading the density level of the white reference plate 15 in the aforementioned manner are sequentially stored per pixel in a white data memory 44 having a capacity of one line through switching circuits 41 and 42 (step S8).

At a subsequent step S9, the optical density level of the black reference plate 16 is read by the CCD line sensor 8 in a state irradiated by the light 5 from the light source 4. The black reference level data $V_{iCCD}(D_B)$ thus detected are digitized to be supplied to the shading correction circuit 18 of FIG. 9. At this time, the switching circuit 42 in the shading correction circuit 18 is switched to the side of a black data memory 43 having capacity for one line. Thus, the black reference level data $V_{iCCD}(D_B)$ are sequentially stored for each pixel in the black memory 43. Thereafter the switching circuit 41 of FIG. 9 is switched to the side of a subtracter 45.

As movement in the subscanning direction A in FIG. 2A proceeds to start reading of the original 3, the image data $V_{iCCD}(=V_{iCCD}(D))$ outputted from the respective CCD elements of the CCD line sensor 8 are digitized to be sequentially transferred to the shading correction circuit 18. In synchronization with this, the data $V_{iCCD}(D_B)$ and $V_{iCCD}(D_W)$ stored in the black and white data memories 43 and 44 are cyclically read out in order of CCD alignment to be outputted. Thus, the subtracter 45 outputs a first difference:

$$(V_{iCCD}(D) - V_{iCCD}(D_B)) \tag{13}$$

Another subtracter 46 outpus a second difference $$(V_{iCCD}(D_W) - V_{iCCD}(D_B)) \tag{14}$$

Within these, the second difference is supplied to a memory 47 storing a look-up table for outputting inverse numbers of inputted values. Therefore, the memory 47 outputs:

$$(V_{iCCD}(D_W) - V_{iCCD}(D_B))^{-1} \tag{15}$$

The data respectively expressed by the expressions (13) and (15) are multiplied by each other in a multiplier 48. Thus, an arithmetic step of dividing the first difference between the image data $V_{iCCD}(D)$ and the black reference level data $V_{iCCD}(D_B)$ by the second difference between the white reference level data $V_{iCCD}(D_W)$ and the black reference level data $V_{iCCD}(D_W)$ is performed to obtain a difference ratio signal. The difference ratio signal outputted from the multiplier 48 is supplied to another multiplier 49, to be multiplied by $V_{NO}$.

Thus, the shading correction circuit 18 performs the arithmetic step along the lines of the expression (7) to output the image signal $V_N$ after shading correction (step S10). Background correction is also simultaneously executed by the shading correction at step S10.

The image signal $V_N$ is supplied to the gradation correction circuit 19, to be subjected to gradation correction responsive to the table stored in the RAM 19a (step S11). Thus, an image signal $V_1$ providing a desired halftone area rate G for each density level D is obtained. The image signal $V_1$ is subjected to contour enhancement processing and a magnification change processing in the image processing circuit 20, to be converted into an image signal $V_2$ (step S12). An exposure/recording of the photosensitive material 29 is performed along the process as hereinabove described (step S13), to complete the routine upon completion of scanning over the entire surface of the original 3 (step S14).

Although the effect of the background light components is eliminated in the stage of the shading correction in the first embodiment as hereinabove described, the arithmetic step to obtain the difference for such background correction may be performed in any of the stages for processing the output of the photoelectric conversion means.

Further, a circuit dedicated to background correction may be provided to be interposed in a transfer path for the image signal. For example, the photoelectric converter (CCD line sensor) is provided in its rear state with a subtracter for subtracting a reference level data $V_{iCCD}(D_O)$ obtained by detecting the output of the CCD line sensor reading a known density level $D_O$. Then, a difference $\Delta V_i$ therebetween from the expression (4) is obtained as:

$$\Delta V_i = S_i I_0 (10^{-D} - 10^{-D_O}) \tag{16}$$

Since $S_i$, $I_O$ and $D_O$ are known values, data $S_i I_O 10^{-D}$ or $10^{-D}$ free from any effect of dark output voltage and background light component levels are obtained by the following expression (17) or (18) obtained by transforming the expression (16):

$$S_i I_0 10^{-D} = \Delta V_i + S_i I_0 10^{-D_O} \tag{17}$$

$$10^{-D} = (\Delta V_i / S_i I_O) + 10^{-D_O} \tag{18}$$

In an appratus performing no shading corrections, therefore, it is not necessary to prepare two types of reference density planes, but the effect of the background light can be eliminated by preparing a single reference density plane having a known density level.

The reference optical density plane (surface) may not be prepared by a member such as the black reference plate in the first embodiment, but it may be prepared by painting or coating the surface of the original receiving glass plate 2 with a material having a known optical density. Further, the reference density plate may be manually placed in a position for receiving the original 3 before placing of the original 3 thereby to read the same by the photoelectric converter. This reference density plate is removed in reading of the original.

Thus, the position for preparing the reference density plane in the present invention is that for receiving the original or in the vicinity thereof.

Figure 10:
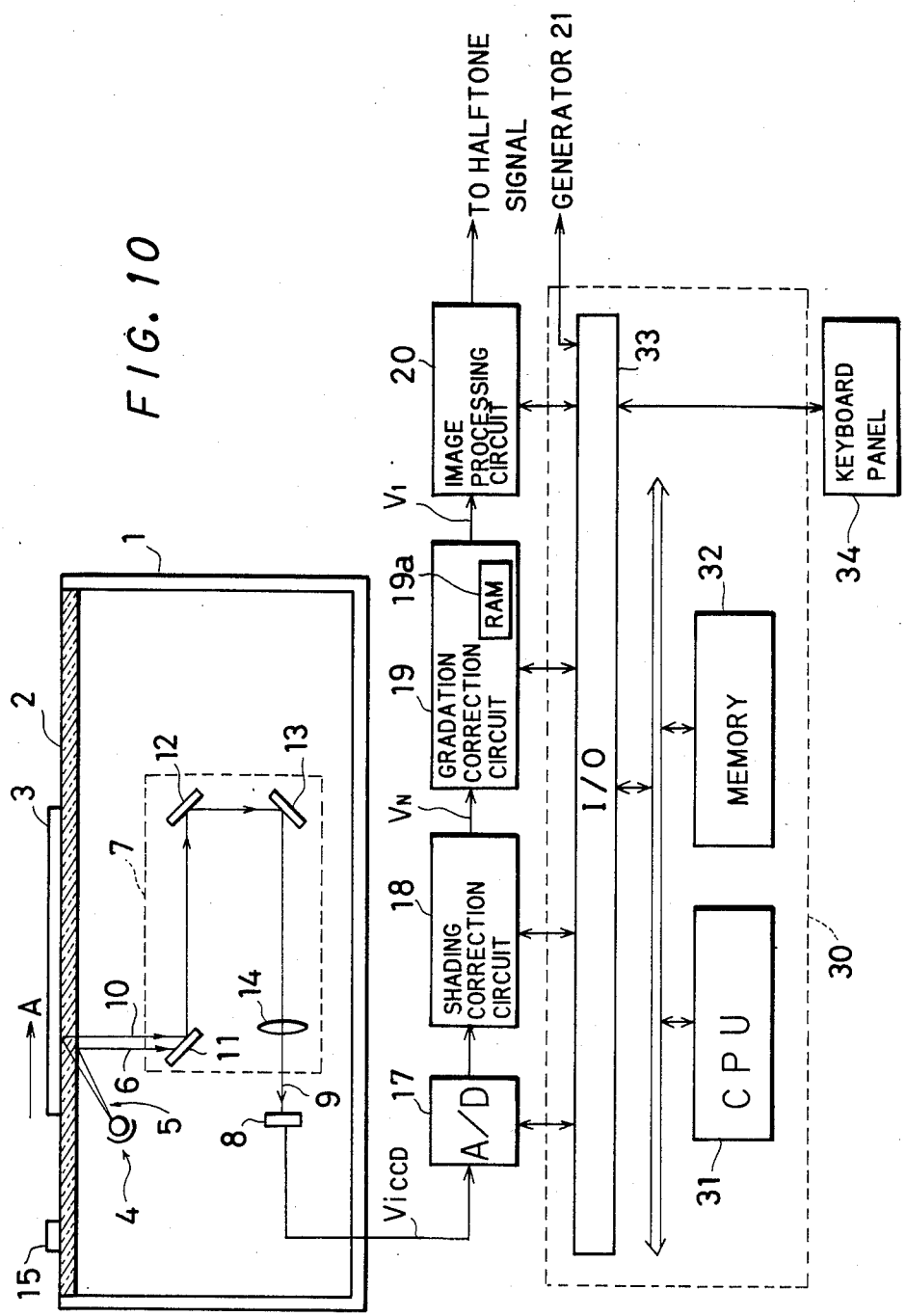
FIG. 10 partially illustrates a second embodiment of the present invention.

FIG. 10 partially illustrates a second embodiment of the present invention. An image data processing apparatus as shown in FIG. 10 is employed in combination with the recording apparatus as shown in FIG. 2B. The second embodiment is provided with a white reference plate 15 alone, and no black reference plates are provided. A shading correction circuit 18 performs shading correction on inputted image data similarly to the conventional case. A gradation correction circuit 19 is in structure specific to the second embodiment, and elimination of background components from the first image data is performed by the gradation correction circuit 19. In other words, background correction circuit 19 for image data $V_N$ also serves as a gradation correction circuit.

Figure 11:
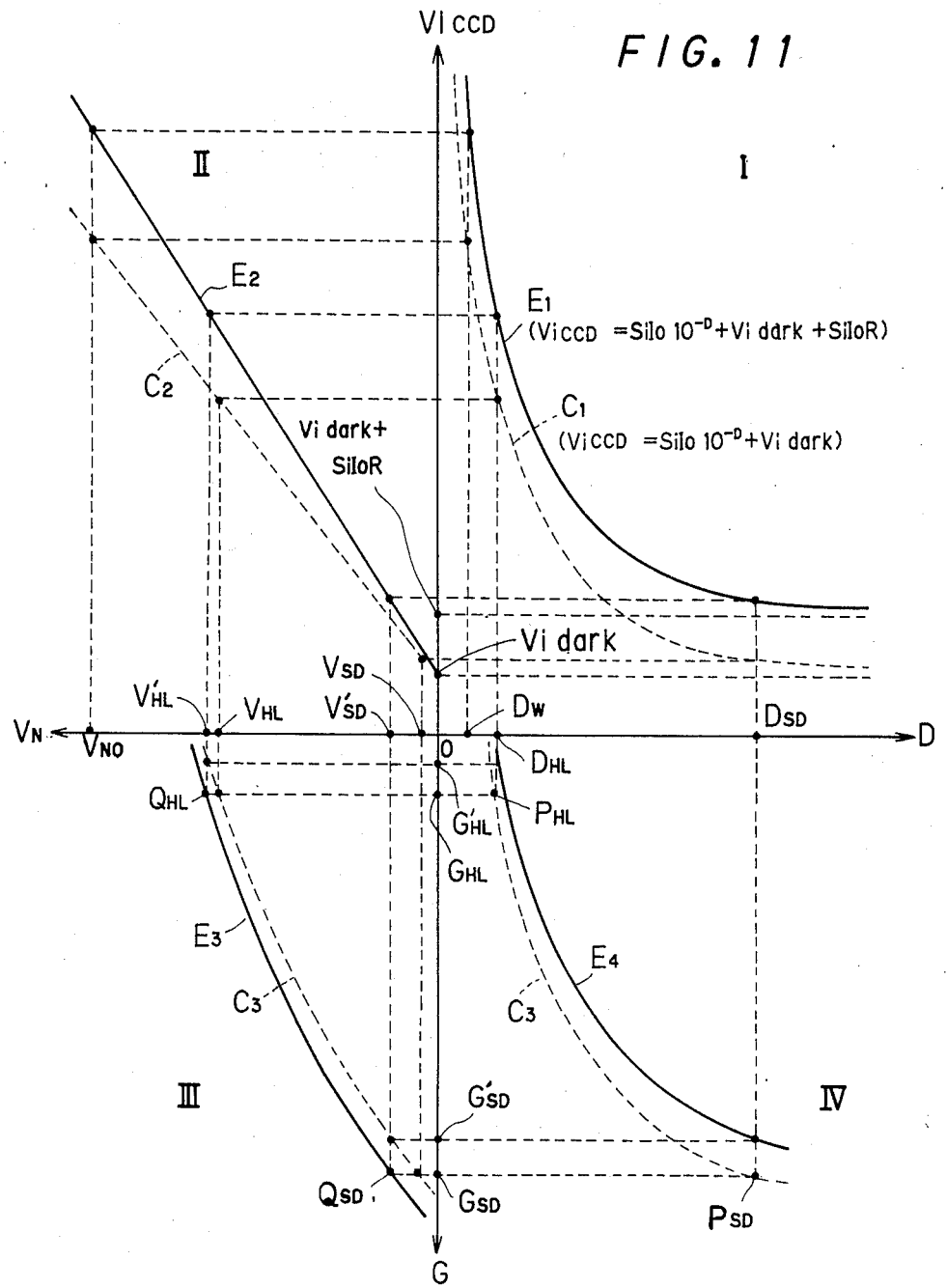
FIGS. 11 and 12 are graphs showing image data conversion characteristics in the second embodiment.

FIG. 11 shows the principle of the second embodiment. Various characteristic curves and lines as shown in FIG. 11 are respectively identical to those shown in FIG. 3, except for a gradation conversion curve $E_3$. The gradation correction curve $E_3$ has a characteristic for eliminating the background components from the image data $V_N$. The gradation correction curve $E_3$ is obtained as follows:

First, it is noted that image signal $V_N$, after shading correction coresponding to the respective density levels $D_{HL}$ and $D_{SD}$ highlight and shadow points, become $V'_{HL}$ and in FIG. 11 $V'_{SD}$ when background light is present. These values are displaced from the image signal levels $V_{HL}$ and $V_{SD}$ in the case of absence of the background light.

Therefore, the gradation correction curve $E_3$ is determined to pass through two coordinate points:

$$Q_{HL} = (V'_{HL}, G_{HL})$$

$$Q_{SD} = (V'_{SD}, G_{SD})$$

in the third quadrant III. Within these, halftone area rates $G_{HL}$ and $G_{SD}$ are values previously designated to be in correspondence to the density levels $D_{HL}$ and $D_{SD}$. The values $V'_{HL}$ and $V'_{SD}$ are obtained through the expression (6) as follows:

$$V'_{HL} = V_{NO}(10^{-D_{HL}} + R)/(10^{-D_W} + R) \qquad (19)$$

$$V'_{SD} = V_{NO}(10^{-D_{SD}} + R)/(10^{-D_W} + R) \qquad (20)$$

where the value of the background parameter R expressing the intensity of the background light components is previously obtained on the basis of a result of the measurement as hereinafter described. Further, the functional form of the gradation correction curve $E_3$ itself is not particularly restricted, but the functional form similar to that of the gradation correction curve $C_3$ may be employed. Therefore, a simple functional form such as a polynominal may be employed, for example, while curves prepared as formulas or numerical data may be combined per several intervals.

Within these, relations between the density levels $D_{HL}$, $D_{SD}$ and the halftone area rates $G_{HL}$, $G_{SD}$ and the general functional form of the curve $E_3$ and the like are treated as "first gradation correction data", which are previously stored in the memory 32. Further, the definite value of the curve $E_3$ specialized by the condition of passing through the coordinate points $Q_{HL}$ and $Q_{SD}$ is "second gradation correction data".

Thus, when the density level $D_{HL}$ of the highlight point is read, for example, conversion through characteristic curves $E_1$, $E_2$ and $E_3$ is performed to provide a desired halftone area rate $G_{HL}$. This also applies to the density level $D_{SD}$ of the shadow point. Since the respective functional forms of the characteristic curves $C_3$ and $E_3$ themselves are not so much different from each other in the interval between the highlight and shadow points, the conversion from the density D to the halftone area rate G is performed along a curve $C_4$ intended by the operator.

Figure 12:
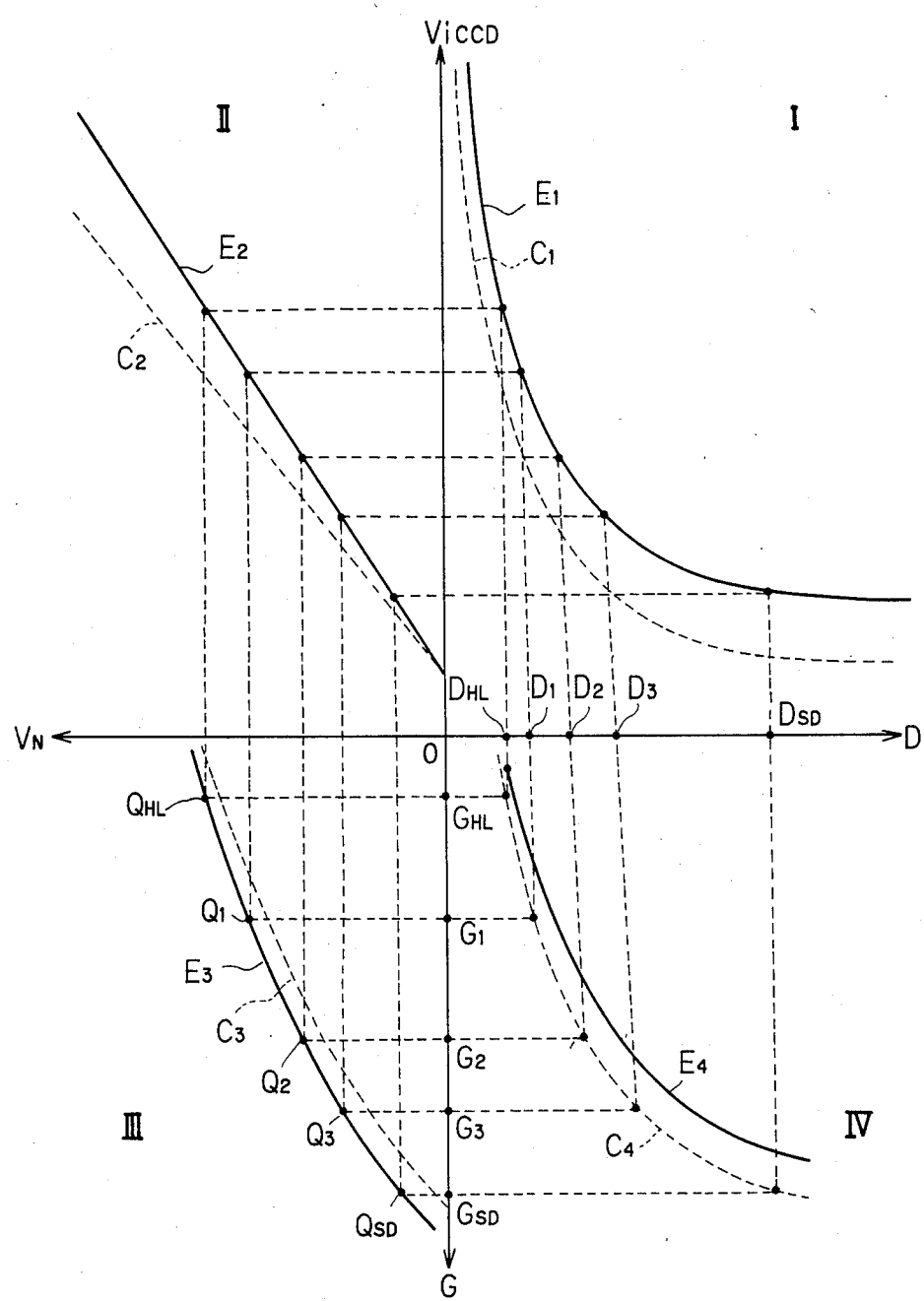

Further, as illustrated in FIG. 12, halftone area rates $G_1$, $G_2$ and $G_3$ can be designated also with respect to desired density levels $D_1$, $D_2$ and $D_3$ respectively, other than the highlight and shadow points. In this case, points $Q_1$, $Q_2$ and $Q_3$ in the third quadrant III are obtained in correspondence to the halftone area rates $G_1$, $G_2$ and $G_3$ in a manner similar to the above, to specify the characteristic curve $E_3$ to pass through all of these points $Q_{HL}$, $Q_{SD}$, $Q_1$, $Q_2$ and $Q_3$. The gradation correction can be further suitably performed by employing this method.

Figure 13A:
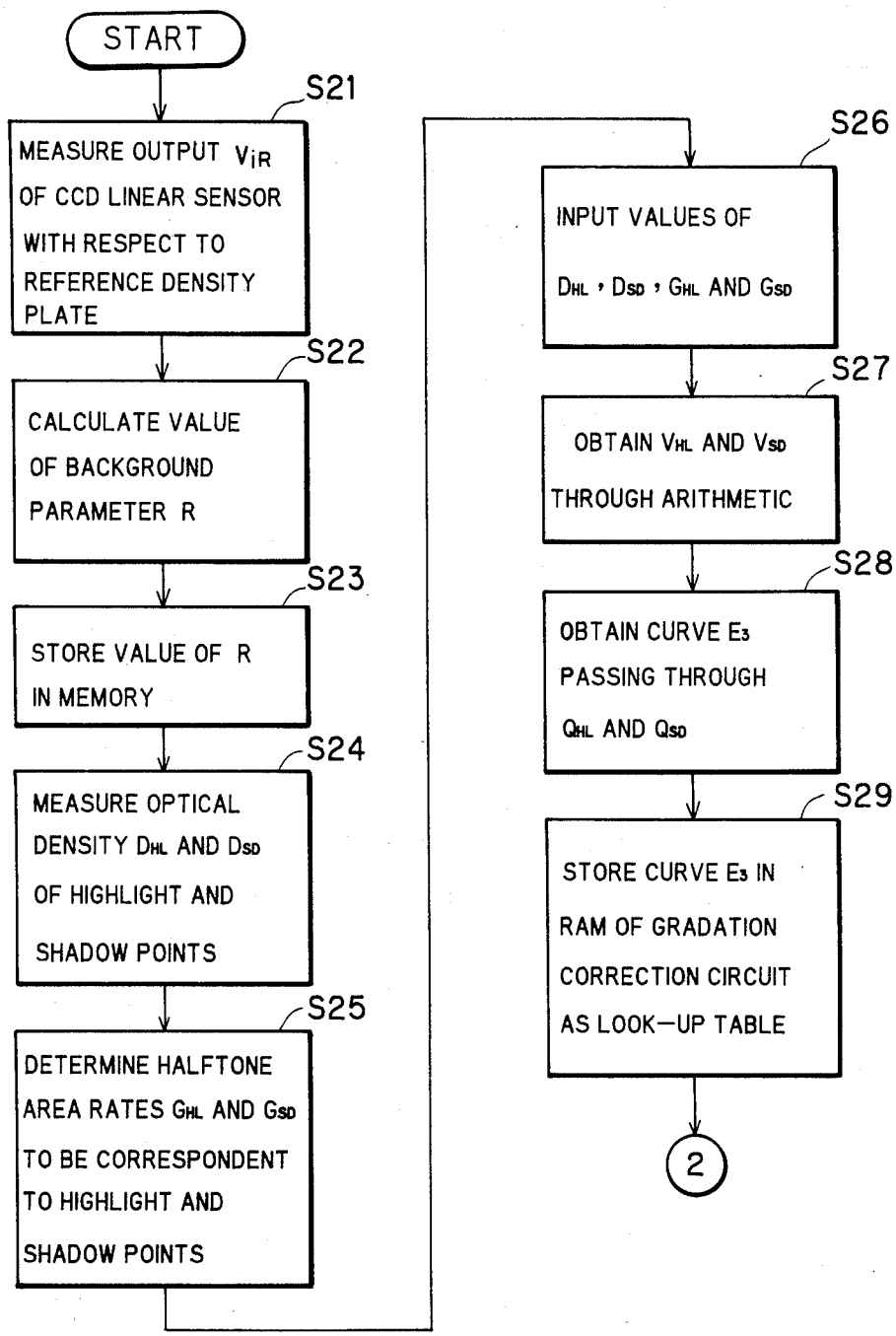

Description is now made of the operation of the second embodiment based on the aforementioned principle with reference to the flow chart shown in FIGS. 13A and 13B. At step S21 of FIG. 13A, a light source 4 is turned on while another reference density plate (e.g., a black or gray reference plate), whose density level is previously known, is placed on an original receiving glass plate 2 in a downwardly directed manner. Then the reference output voltage $V_{iR}$ of a CCD line sensor 8 in this state is measured. Such a measurement can be achieved by detecting the output $V_{iCCD}$ of the CCD line sensor 8 by a voltage detector, for example.

The reference output voltage $V_{iR}$ has a value $V_N$ expressed by the following expression (21) through the expression (6), after shading correction:

$$V_N = V_{NO}(10^{-D_R} + R)/(10^{-D_W} + R) \qquad (21)$$

where $D_R$ represents the density level of the black or gray reference density plate. In the right side of the expression (21), $V_{NO}$ and $D_W$ are known values.

At a subsequent step S22, the value of the reference output voltage $V_N$ obtained at step S21 and the values of $V_{NO}$, $D_R$ and $D_W$ are substituted in the following expression (22) obtained by transforming the expression (21), to obtain the value of the background parameter R through arithmetic processing:

$$R = \frac{V_{NO} \cdot 10^{-D_R} - V_N 10^{-D_W}}{V_N - V_{NO}} \qquad (22)$$

The value of the background parameter R thus obtained is stored in a memory 32 (step S23).

Each of the aforementioned steps may be performed once in the stage of an experimental prototype or a production unit of the apparatus, and the value of the background parameter R may be stored as a fixed value in the memory 32. In this case, the value of the background parameter R is commonly employed for respective originals. When the value of the background parameter R is to be obtained with a higher accuracy in consideration of variations among products and secular changes, the black or gray reference density plate may be provided adjacent a white reference plate 15 to execute the steps S21 to S23 before each reading of the original. Thus, in this case, a background correction can be performed in a variable manner for each original.

A subsequent step S24 and those following thereto correcpond to operation after the production of the apparatus is completed. At step S24, the operator selects highlight and shadow points of the original 3, and measures the density levels $D_{HL}$ and $D_{SD}$ thereof. Then the operator arbitrarily determines halftone area rates $G_{HL}$ and $G_{SD}$ to correspond to the highlight and shadow points (step S25). These values $D_{HL}$, $D_{SD}$, $G_{HL}$ and $G_{SD}$ are inputted through a keyboard panel 34 (step S26). These data are also stored in the memory 32. The optical density level $D_W$ of the white reference plate 15 and the value $V_{NO}$ of the signal $V_N$ to be prvided for the density level $D_W$ are also previously inputted through the keyboard panel 34, to be stored in the memory 32.

Upon completion of such processing, a CPU 31 calculates the values of $V'_{HL}$ and $V'_{SD}$ arithmetically through the expressions (19) and (20) (step S27). Further, the CPU 31 specifies coordinate values of points $Q_{HL}$ and $Q_{SD}$ in the third quadrant III of FIG. 11 in correspondence to the values $V'_{HL}$ and $V'_{SD}$, to numerically obtain a gradation correction curve $E_3$ passing through both of the points $Q_{HL}$ and $Q_{SD}$ (step S28). This gradation correction curve $E_3$ expresses the rule of gradation correction including background correction. The gradation correction curve $E_3$ thus obtained is written in a RAM 19a of a gradation correction circuit 19 as a look-up table with the image signal $V_N$ after shading correction being processed as addresses and the halftone area rate G being processed as data (step S29).

At a subsequent step S30, the original 3 is placed on the original receiving glass plate 2 in a downwardly directed manner, and a reading start switch (not shown) is turned on. Then, a movement in the subscanning direction and reading operation in the main scanning direction are started. In this operation, the density level of the white reference plate 15 is read at first, so that the image signal $V_{iCCD}$ from each CCD element is digitized to be transferred to a shading correction circuit 18.

Figure 14:
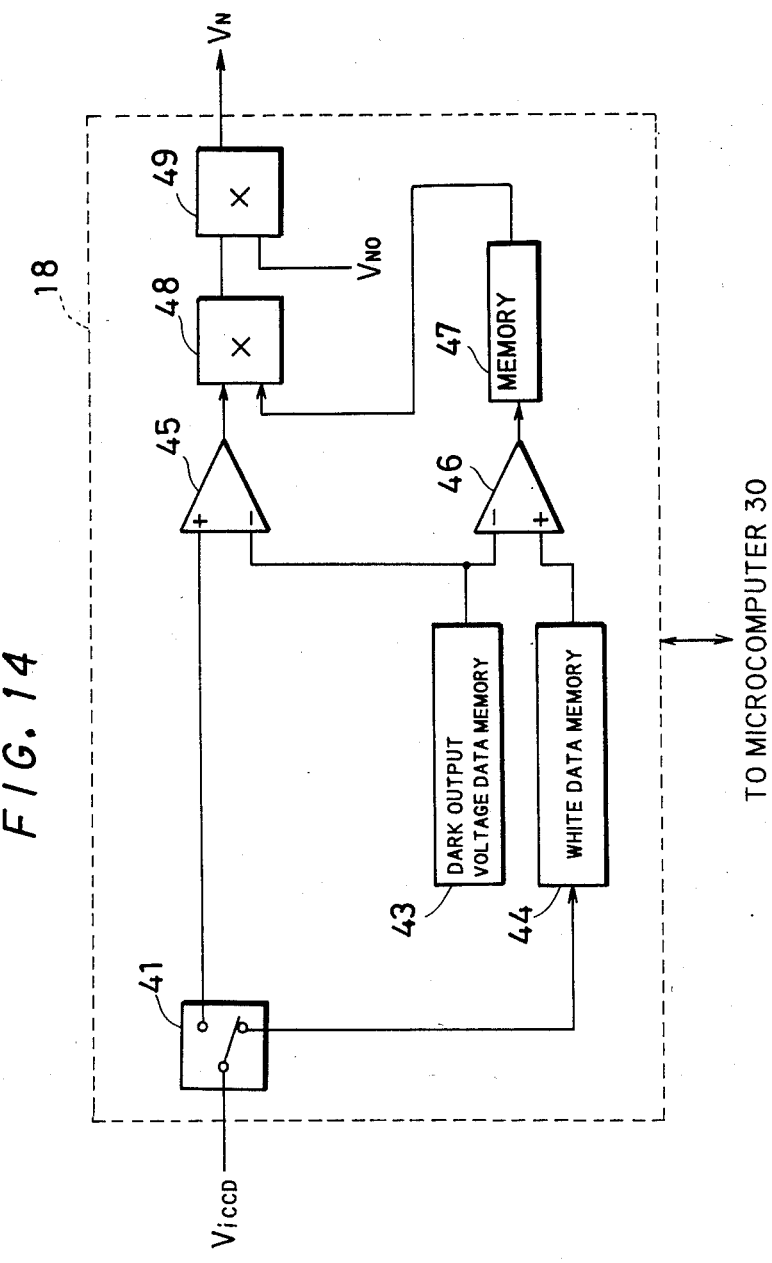
FIG. 14 is a block diagram showing internal structure of a shading correction circuit in the second embodiment.

This shading correction circuit 18 has a structure as shown in FIG. 14. A dark output voltage data memory 50 having a storage capacity of one line previously stores a dark output voltage level $V_{idark}$ of each CCD element forming the CCD line sensor 8. The dark output voltage level $V_{idark}$ may be measured before each reading of the original to be stored in the dark output voltage data memory 50.

On the other hand, data $V_{iCCD}(D_W)$ obtained by reading the density level of the white reference plate 15 are sequentially stored in a white data memory 44 having capacity of one line through a switching circuit (step S31). Thereafter the switching circuit 41 is switched to the side of a subtracter 45.

When reading of the original 3 is started with progress in movement in the subscanning direction A of FIG. 10, the output $V_{iCCD}(=V_{iCCD}(D))$ of each CCD element of the CCD line sensor 8 is digitized to be sequentially transferred to the shading correction circuit 18. In synchronization with this, data $V_{idark}(=V_{iOFF})$ and $V_{iCCD}(D_W)$ stored in the dark output voltage data memory 50 and the white data memory 44 respectively are cyclically read in order of CCD element alignment to be outputted. Therefore, the subtracter 45 outputs:

$$(V_{iCCD}(D) - V_{iOFF}) \quad (23)$$

Another subtracter 46 outputs:

$$(V_{iCCD}(D_W) - V_{iOFF}) \quad (24)$$

Within these differences, the latter is supplied to a memory 47 storing a look-up table for outputting inverse numbers of inputted values. Therefore, the memory 47 outputs:

$$(V_{iCCD}(D_W) - V_{iOFF})^{-1} \quad (25)$$

The data respectively expressed by the expressions (23) and (25) are multiplied by each other in a multiplier 48. The output from the multiplier 48 is supplied to another multiplier 49, to be multiplied by $V_{NO}$. Thus, the shading correction circuit 18 performs arithmetic processing along the lines of expression (2), to output the image signal $V_N$ after shading correction (step S32).

The image signal $V_N$ is supplied to a gradation correction circuit 19 to be subjected to gradation correction (step S35). The gradation correction is performed to eliminate the influence of the background light as hereinabove described. Thus, an image signal $V_1$ for providing desired halftone area rate G for the density D is obtained. This image signal $V_1$ is subjected to contour enhancement processing and magnification change processing by the image processing circuit 20 (step S34). Exposure/recording of a photosensitive material 29 is performed along the aforementioned process (step S35), to complete the routine upon completion of whole scanning over the entire surface of the original (step S36).

When the value of the background parameter R is obtained for every reading operation, the steps S21 to S23 and S27 to S29 are to be performed after the step S31.

The present invention can also be implemented by the following modifications:

The present invention is also applicable to an image processing apparatus of other scanning mechanisms such as one oscillating a laser beam through a photomultiplier or a photodiode and employing rotary drum scanning.

The background correction can also be performed by modifying an image correction curve in image corection processing other than gradation correction. A subtracter for subtracting $S_iI_0R$ from output $V_{iCCD}$ of the photoelectric converter may be provided in the rear stage of the photoelectric converter. Then, an image signal of the expression (1) released from the influence by the background light is obtained as is obvious from the expression (4), so that correct image data are obtained as image data before shading correction.

When image data are temporarily preserved in a mass storage memory, such as a magnetic disk, to be read for employment, background correction can be performed after reading from the mass strage memory. In this case, it is also possible to obtain data on background components after reading of the original, to perform background correction. Therefore, it is not indispensable to obtain the data on the background components before reading the original. According to the aforementioned embodiments, however, background correction can advantageously be performed in real time. Various types of characteristic curves $C_4$ may be prepared in accordance with the types of originals, or the same may be arbitrarily changed.

Although each of the aforementioned embodiments is applied to a process scanner, the present invention is applicable to various types of image processing devices such as a facsimile and a copying machine having gradation reproducibility.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image data processing method for processing first image data obtained by optically reading the image of an original having gradation thereby to obtain second image data correctly reflecting said gradation of said original, said image data processing method comprising the steps of:
   (a) preparing a reference density plane having a known optical density;
   (b) reading the optical density of said reference density plane with a photoelectric converter while detecting an output level of said photoelectric converter to obtain a reference level data expressing said output level;
   (c) reading said image of said original by said photoelectric converter thereby to obtain the first image data; and
   (d) removing a background component from said first image data on the basis of said reference level data, thereby to obtain the second image data, said background component being outputted from said photoelectric converter independently of said image of said original including the step of obtaining a difference between said first image data and said reference level data whereby said background components included in both of said first image data and said reference level data cancel each other;
   wherein said reference density plane includes a white reference density plane and a black reference density plane respectively having known optical density,
   said reference level data include white reference level data and black reference level data,
   step (b) includes the steps of:
   (b-1) reading the optical density of said white reference density plane by said photoelectric converter to obtain said white reference level data; and
   (b-2) reading the optical density of said black density reference plane by said photoelectric converter to obtain said black reference level data, and
   step (d) includes the steps of:
   (d-1) obtaining a first difference between said first image data and said black reference level data;
   (d-2) obtaining a second difference between said white reference level data and said black reference level data; and
   (d-3) dividing said first difference by said second difference.

2. An image data processing method in accordance with claim 1, wherein
   said background component is removed from said first image data through a shading correction of said first image.

3. An image data processing method in accordance with claim 2, wherein
   said first image data are converted into data having positive/negative sign in said shading correction.

4. An image data processing apparatus for processing first image data obtained by optically reading the image of an original having gradation thereby to obtain second image data correctly reflecting said gradation of said original, said image data processing apparatus comprising:
   (a) a reference density plane having a known optical density;
   (b) photoelectric conversion means for reading said optical density of said reference density plane and said image of said original;
   (c) memory means for storing reference level data obtained by reading said optical density of said reference density plane by said photoelectric conversion means;
   (d) shading correction means for receiving the first image data obtained by reading said image of said original by said photoelectric conversion means for performing shading correction on said first image data, said shading correction means having:
   (d-1) read means for reading said reference level data from said memory means; and
   (d-2) arithmetic means for obtaining a difference between said first image data and said reference level data to output a signal responsive to said difference; and
   (e) means for generating the second image data on the basis of the output signal from said shading correction means
   said reference density plane includes a white reference density plane and a black reference density plane respectively having known optical density,
   said reference level data include white reference level data and black reference level data,
   said arithmetic means includes:
   first subtraction means for obtaining a first difference between said black reference level data and said first image data,
   second subtraction means for obtaining a second difference between said white reference level data and said black reference level data;
   dividing means for dividing said first difference by said second difference to provide a difference ratio signal, and
   means for generating said second image data in response to said difference ratio signal.

5. An image data processing aparatus in accordance with claim 4, wherein
   said first image data are converted into data having positive/negative sign in said shading correction means.

6. An image data processing apparatus for processing first image data obtained by optically reading the image of an original having gradation thereby to obtain second image data correctly reflecting said gradation of said original, said image data processing apparatus comprising:
   (a) photoelectric conversion means for reading said image of said original;
   (b) memory means for previously storing the value of a background parameter expressing the intensity of a background component outputted from said photoelectric conversion means, where said background component corresponds to the intensity of a background light indirectly coming from said original to said photoelectric conversion means, and said background parameter is previously obtained by reading reference density planes having finite optical densities to obtain reference level data and then transforming said reference level data through a transformation function which expresses said background parameter with the value of said reference level data and respective known values of said finite optical densities; and (c) background correction means for performing background correction on the first image data obtained by reading said image of said original by said photoelectric conversion means in response to said value of said background parameter read from said memory means thereby to obtain the second image data.

7. An image data processing apparatus in accordance with claim 6 wherein
said background correction means also serves as gradation correction means for performing a gradation correction on said first image data, said background correction means having:

(c-1) storage means for storing first gradation correction data previously prepared for a case of an absence of said background component, (c-2) arithmetic means for obtaining second gradation correction data for a case of a presence of said background component on the basis of said first gradation correction data read from said strage means and said value of said background parameter read from said memory means; and (c-3) a look-up table memory for storing said second gradation correction data for performing said background correction and said gradation correction on said first image data.

8. An image data processing method for processing first image data obtained by optically reading the image of an original having gradation thereby to obtain second image data correctly reflecting said gradation of said original, said image data processing method comprising the steps of:

(a) preparing reference density planes having known finite optical densities, respectively;

(b) reading the optical densities of said reference density planes with a photoelectric converter while detecting an output level of said photoelectric converter to obtain reference level data expressing said output level for said reference density planes;

(c) obtaining a value of a background parameter expressing the intensity of a background component by transforming said reference level data through a predetermined transformation function, said background component corresponding to background light indirectly coming from said original to said photoelectric converter;

(d) modifying a previously given image correction curve by an amount in accordance with said value of said background parameter to obtain a modified image correction curve;

(e) reading said image of said original by said photoelectric converter thereby to obtain the first image data; and (f) correcting said first image data through said modified image correction curve, thereby to obtain the second image data in which said background component is removed.

9. An image data procesing method in accordance with claim 8, wherein
said image correction curve is a gradation correction curve, and
said image data correcting includes gradation correcting.

10. An image data processing method in accordance with claim 9, wherein
said value of said background parameter is employed in common for each original.

11. An image data processing method in accodance with claim 9, wherein
said value of said background parameter is independently obtained for each original.

* * * * *